United States Patent
Amano et al.

(10) Patent No.: US 8,220,937 B2
(45) Date of Patent: Jul. 17, 2012

(54) PROJECTION OPTICAL SYSTEM AND PROJECTION UNIT FOR OBLIQUE PROJECTION TYPE PROJECTION DISPLAY DEVICE, AND OBLIQUE PROJECTION TYPE PROJECTION DISPLAY DEVICE

(75) Inventors: Ryuhei Amano, Hirakata (JP); Takashi Ikeda, Higashi-Osaka (JP); Takashi Miwa, Higashi-Osaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 727 days.

(21) Appl. No.: 12/019,733

(22) Filed: Jan. 25, 2008

(65) Prior Publication Data
US 2008/0180639 A1   Jul. 31, 2008

(30) Foreign Application Priority Data
Jan. 29, 2007   (JP) .................................. 2007-018100

(51) Int. Cl.
*G03B 21/00* (2006.01)
*G03B 21/14* (2006.01)

(52) U.S. Cl. ............ 353/70; 353/37; 353/100; 353/101; 348/806; 352/140

(58) Field of Classification Search ............... 353/69, 353/101, 100, 70, 79, 30, 31, 34, 37; 348/745, 348/806; 352/140
See application file for complete search history.

(56) References Cited

U.S. PATENT DOCUMENTS

| 5,758,939 | A | 6/1998 | Ochiai et al. | |
| 6,592,228 | B1 * | 7/2003 | Kawashima et al. | ......... 353/101 |
| 6,877,864 | B1 | 4/2005 | Tamura et al. | |
| 2005/0168704 | A1 * | 8/2005 | Gupta et al. | .................... 353/69 |
| 2006/0290896 | A1 * | 12/2006 | Nishida | ........................... 353/69 |
| 2007/0263176 | A1 | 11/2007 | Nozaki et al. | |

FOREIGN PATENT DOCUMENTS

| EP | 0 880 287 A1 | 11/1998 |
| EP | 1 791 329 A1 | 5/2007 |
| JP | 05-100312 | 4/1993 |
| JP | 11-258691 A | 9/1999 |
| JP | 2004-258620 | 9/2004 |
| JP | 2005-227661 A | 8/2005 |
| JP | 2006-113243 A | 4/2006 |
| JP | 2006-301368 A | 11/2006 |
| WO | 2006/030862 A1 | 3/2006 |

* cited by examiner

*Primary Examiner* — Francis M Legasse, Jr.
(74) *Attorney, Agent, or Firm* — Marvin A. Motsenbocker; Mots Law, PLLC

(57) ABSTRACT

An optical position of a display device with respect to an optical axis of a projection optical system is displaced in a direction perpendicular to the optical axis in accordance with a change in the size of a projected image. For instance, a transparent flat plate is disposed in front of a projection lens, and the transparent flat plate is tilted in association with a rotation of a zoom adjustment ring. As the transparent flat plate is tilted, the apparent position of the display device relative to the projection lens is displaced in the direction perpendicular to the optical axis of the projection optical system. Thereby, the projected image on a screen is located at a proper position corresponding to a zoom state. Tilt control of the transparent flat plate is realized by a cam mechanism, for instance.

10 Claims, 11 Drawing Sheets

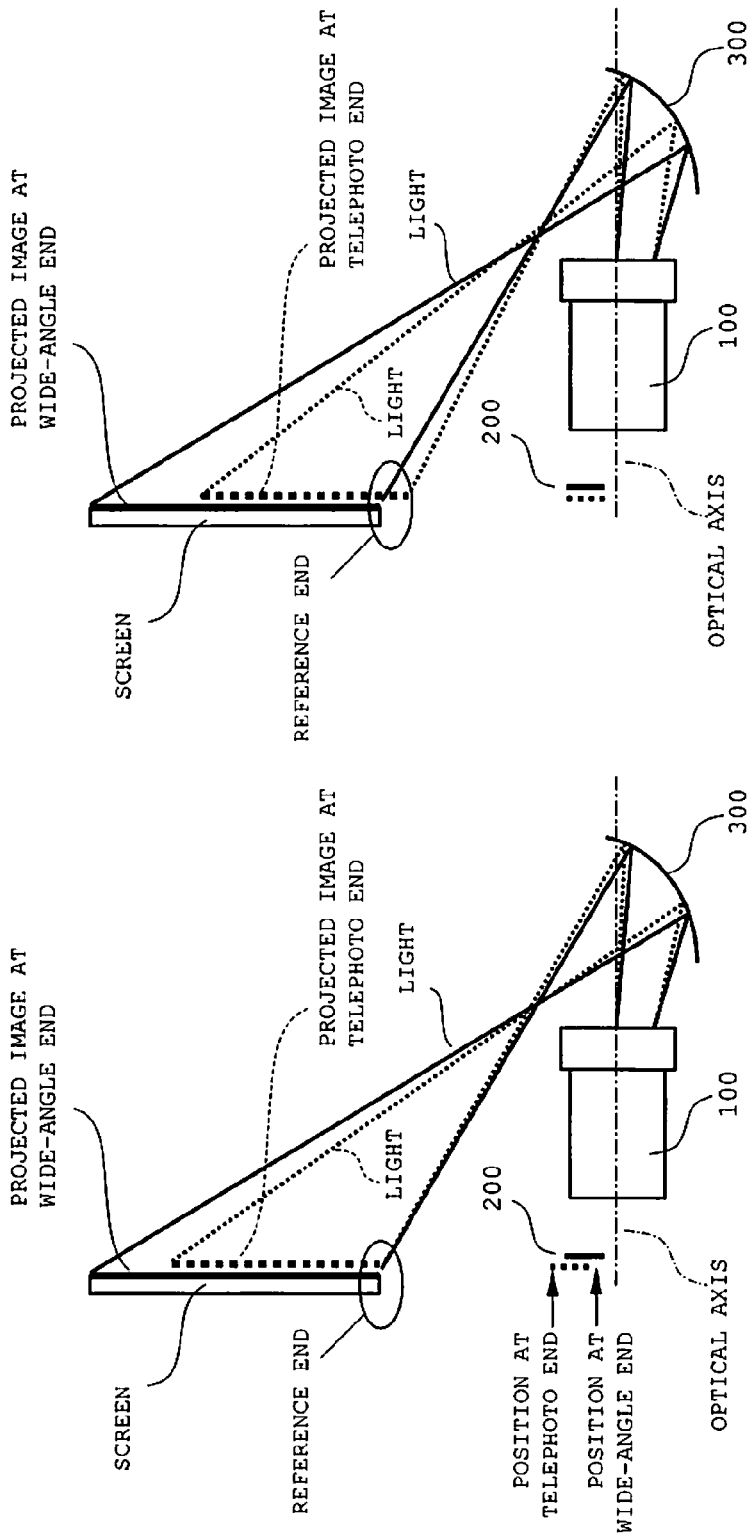

STATE WHERE DISPLAY DEVICE IS DISPLACED

STATE WHERE DISPLAY DEVICE IS NOT DISPLACED

PROJECTION OPTICAL SYSTEM AND PROJECTION UNIT FOR OBLIQUE PROJECTION TYPE PROJECTION DISPLAY DEVICE, AND OBLIQUE PROJECTION TYPE PROJECTION DISPLAY DEVICE

This application claims priority under 35 U.S.C. Section 119 of Japanese Patent Application No. 2007-018100 filed Jan. 29, 2007, entitled "PROJECTION OPTICAL SYSTEM, PROJECTION UNIT, AND PROJECTION DISPLAY DEVICE".

BACKGROUND OF THE INVENTION

1. Field of the Invention

The present invention relates to a projection optical system, a projection unit, and a projection display device, and more particularly to an oblique projection type projection display device.

2. Description of the Related Art

A projection display device (hereinafter, called as "a projector") for enlargedly projecting an image on a display device such as a liquid crystal panel onto a projection plane such as a screen has been commercialized and widely spread. A technique of shortening the distance between the screen and the projector main body has been developed in the field of projectors. Applying a wide-angle arrangement to a projection optical system and tilting a propagating direction of projection light with respect to an optical axis of the projection optical system is advantageous in shortening the distance between the screen and the projector main body.

For instance, there is proposed a projection optical system using a wide-angle lens having a large angle of view, and constructed in such a manner that a display device and a screen are shifted in directions opposite to each other with respect to an optical axis of the projection optical system. The above arrangement enables to shorten the projection distance.

There is also proposed a projection optical system using a refractive optics and a reflecting plane, and constructed in such a manner that an image on a display device is formed as an intermediate image at a position between the refractive optics and the reflecting plane, and the intermediate image is enlargedly projected onto a screen by the reflecting plane. The above arrangement is advantageous in further shortening the projection distance.

The following drawback, however, may occur in the projector using the wide-angle arrangement and the arrangement of obliquely projecting light. Specifically, in the case where a zoom function is added to the projector, the projecting position of the projected image on the screen may be greatly shifted depending on a change in a zoom state. As a result of the shifting, a part of the projected image may be deviated from the screen.

In the arrangement of enlargedly projecting the intermediate image by the reflecting plane, the forming position of the intermediate image may be greatly shifted depending on a change in a zoom state. In view of the shifting, a relatively large reflecting plane may be necessary to cover the entire area where the forming position is supposed to be shifted.

SUMMARY OF THE INVENTION

A first aspect of the present invention relates to a projection optical system for use in a projection display device for enlargedly projecting an image on a display device onto a projection plane. The projection optical system includes: a zoom adjuster for adjusting a size of the projected image on the projection plane; and a shift adjuster for displacing an optical position of the display device with respect to an optical axis of the projection optical system in a direction perpendicular to the optical axis in accordance with a change in the size of the projected image by the zoom adjuster.

A second aspect of the present invention relates to a projection unit provided with a display device, and a projection optical system for enlargedly projecting an image on the display device onto a projection plane. The projection unit includes a zoom adjuster for adjusting a size of the projected image on the projection plane; and a shift adjuster for displacing an optical position of the display device with respect to an optical axis of the projection optical system in a direction perpendicular to the optical axis in accordance with a change in the size of the projected image by the zoom adjuster.

A third aspect of the present invention relates to a projection display device. The projection display device includes the projection optical system defined in the first aspect, or the projection unit defined in the second aspect.

BRIEF DESCRIPTION OF THE DRAWINGS

These and other objects, and novel features of the present invention will become more apparent upon reading the following detailed description along with the accompanying drawings.

FIGS. 5A and 5B are diagrams showing another arrangement example of a projector embodying the present invention.

FIGS. 9A, 93, and 9C are diagrams showing another arrangement example of the projection unit of the embodiment.

Figure 1:
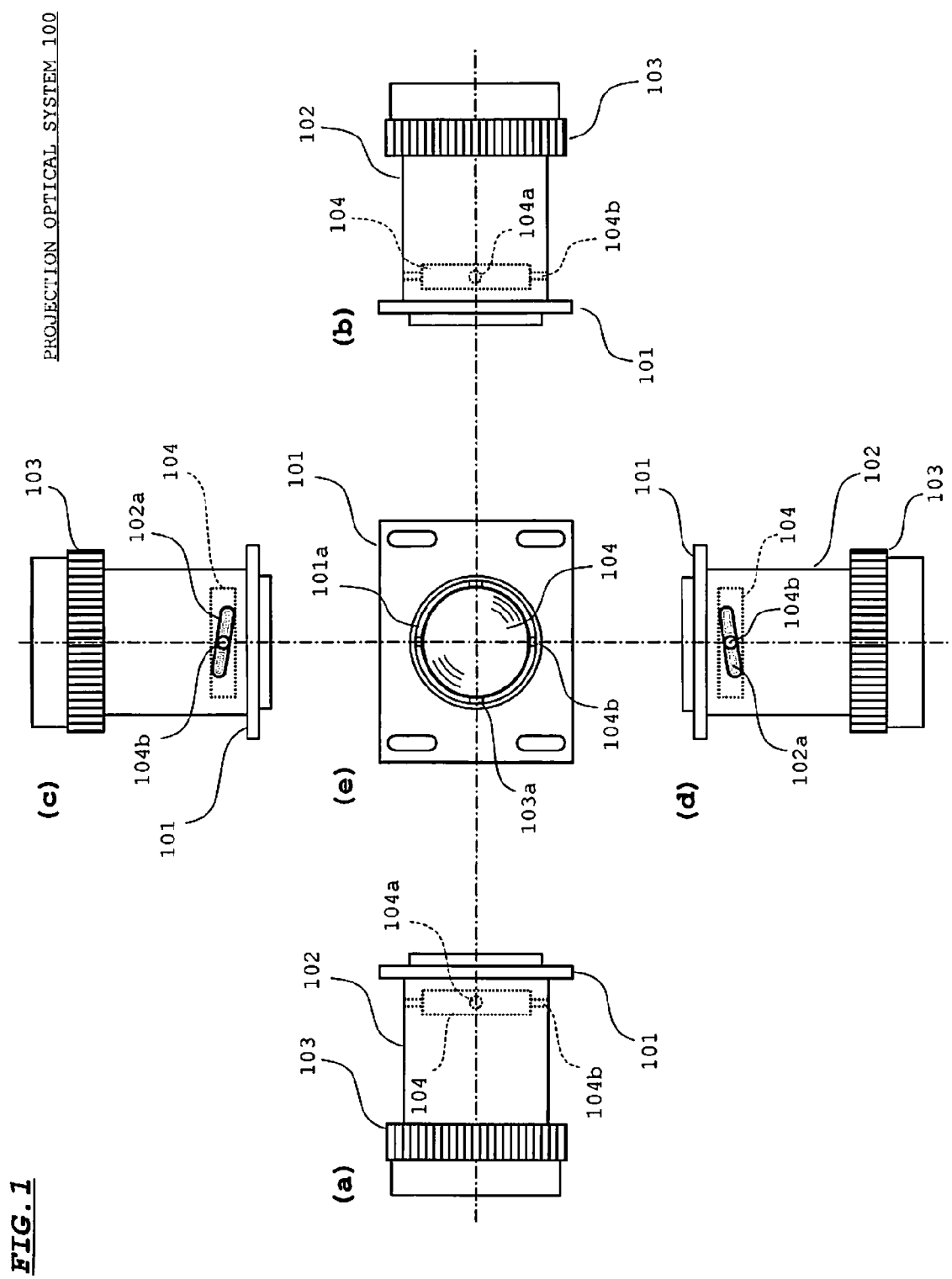
FIG. 1 is a diagram showing an arrangement of a projection optical system embodying the present invention.

The drawings are provided mainly for describing the present invention, and do not limit the scope of the present invention.

DESCRIPTION OF THE PREFERRED EMBODIMENTS

In the following, an embodiment of the present invention is described referring to the drawings. The embodiment of the present invention is described on a case that the present invention is applied to an oblique projection type projector.

FIG. 1 is a diagram showing an arrangement of a projection optical system 100 to be loaded in a projector embodying the present invention. The illustrations (a) through (e) in FIG. 1 respectively correspond to a left side view, a right side view, a top plan view, a bottom plan view, and a front view, assuming that the light incident side of the projection optical system 100 corresponds to a front side.

Referring to FIG. 1, the reference numeral 101 indicates a support member, the reference numeral 102 indicates a cylindrical outer lens barrel, the reference numeral 103 indicates a zoom adjustment ring, and the reference numeral 104 indicates a transparent flat plate. The outer lens barrel 102 is supported on the support member 101 in such a manner that the outer lens barrel 102 is rotatable in a circumferential direction thereof. The zoom adjustment ring 103 is integrally rotated with the outer lens barrel 102 in a circumferential direction thereof. When the zoom adjustment ring 103 is rotated, a part of lenses provided in the projection optical system 100 is displaced in the optical axis direction. Thereby, the size of a projected image on a screen as a projection plane is changed. The transparent flat plate 104 includes a circular glass plate having a predetermined thickness.

A lens barrel i.e. an optical-component fixing lens barrel 105 for fixing optical components such as the lenses is mounted in the outer lens barrel 102. The lens barrel 105 is mounted on the support member 101 in a state that a circumferential rotation thereof is restricted.

Figure 2:
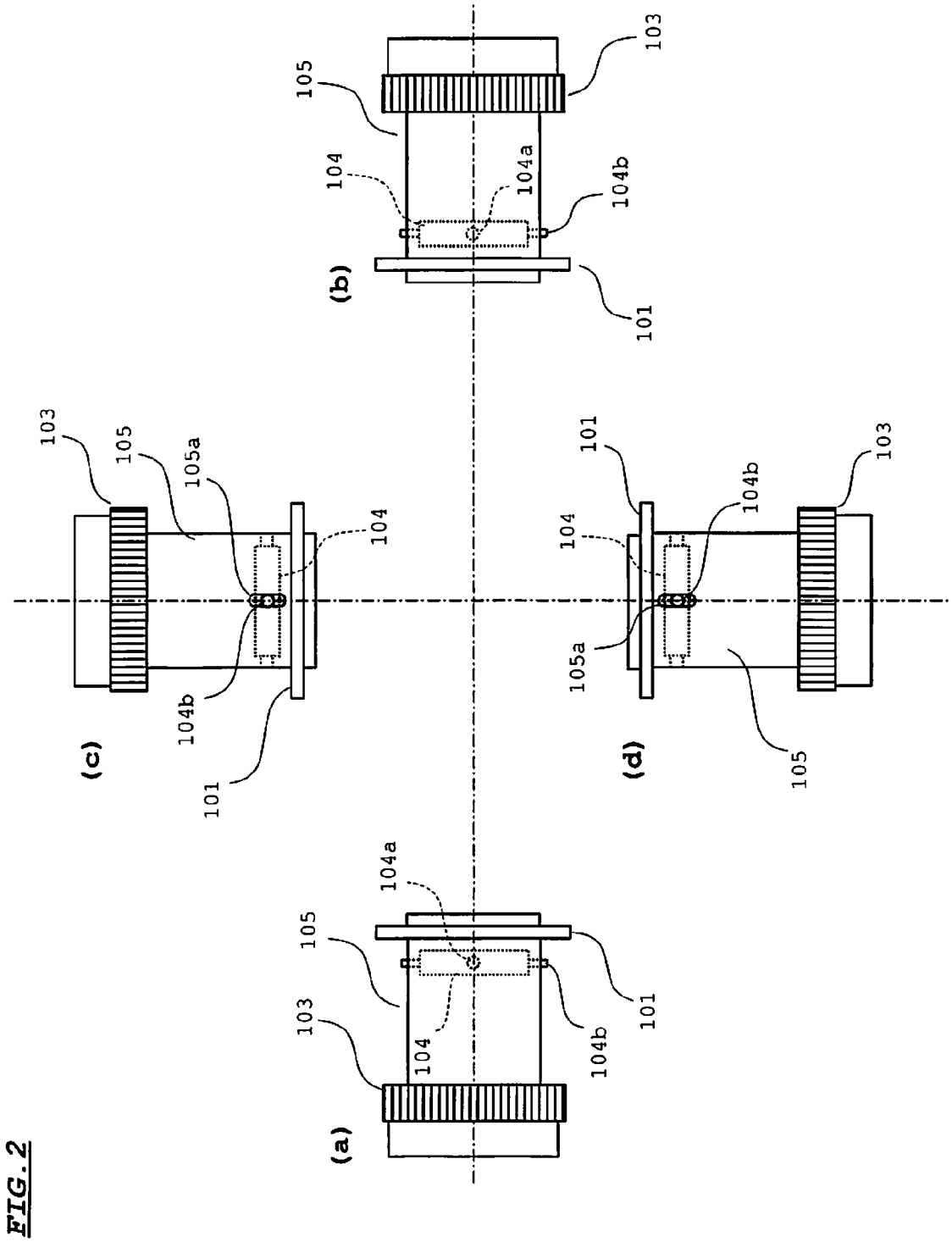
FIG. 2 is a diagram showing a state that an outer lens barrel is removed from the projection optical system of the embodiment.

FIG. 2 is a diagram showing a state that the outer lens barrel 102 is removed from the projection optical system 100. The illustrations (a) through (d) in FIG. 2 respectively correspond to a left side view, a right side view, a top plan view, and a bottom plan view, assuming that the light incident side of the projection optical system 100 corresponds to a front side.

As shown in FIG. 2, the transparent flat plate 104 is mounted in the optical-component fixing lens barrel 105 inserted into the outer lens barrel 102 via a rod 104a to be tiltable with respect to vertical directions. A guide hole 105a is formed in each of an upper surface and a lower surface of the optical-component fixing lens barrel 105 along the optical axis direction of the projection optical system 100. On the other hand, vertically projecting pins 104b are provided on the transparent flat plate 104 in such a manner that the pins 104b project outwardly through the guide holes 105a formed in the upper and lower surfaces of the optical-component fixing lens barrel 105, respectively.

Referring back to FIG. 1, two cam holes 102a are formed in upper and lower surfaces of the outer lens barrel 102 with an inclination with respect to the optical axis direction of the projection optical system 100, respectively. The two pins 104b projecting from upper and lower surfaces of the transparent flat plate 104 are engaged in the two cam holes 102a, respectively. The two cam holes 102a formed in the upper and lower surfaces of the outer lens barrel 102 extend in the same direction and with the same inclination. In the above arrangement, when the zoom adjustment ring 103 is circumferentially rotated to circumferentially rotate the cam holes 102a, the two pins 104b provided on the upper and the lower surfaces of the transparent flat plate 104 are displaced with respect to the optical axis direction of the projection optical system 100 along the two cam holes 102a, respectively.

In the above operation, since the two cam holes 102 extend in the same direction and with the same inclination, the two pins 104b are displaced in the directions opposite to each other by the same displacement amount in accordance with the rotation of the zoom adjustment ring 103. Thereby, the upper and lower surfaces of the transparent flat plate 104 are displaced in the directions opposite to each other by the same displacement amount in accordance with the rotation of the zoom adjustment ring 103. As a result, the transparent flat plate 104 is tilted in forward or backward direction in accordance with the rotation of the zoom adjustment ring 103.

Figure 3A:
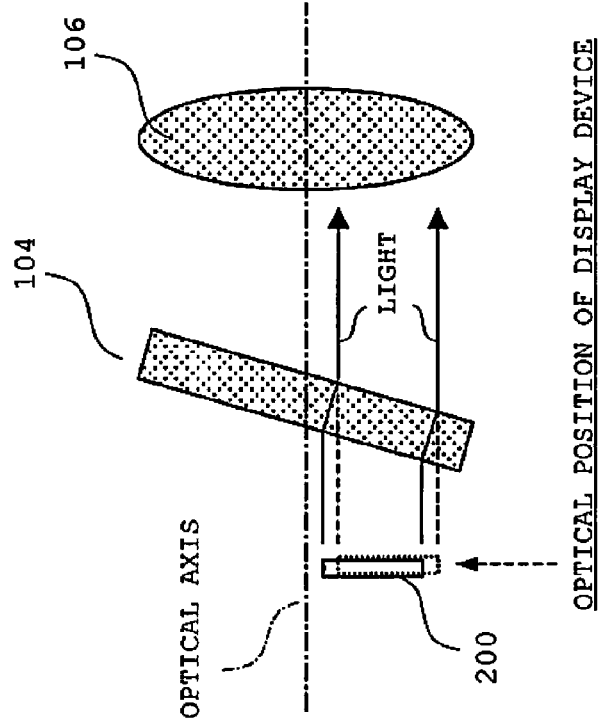
FIGS. 3A and 3B are diagrams for describing an operation of the projection optical system of the embodiment.
Figure 3B:
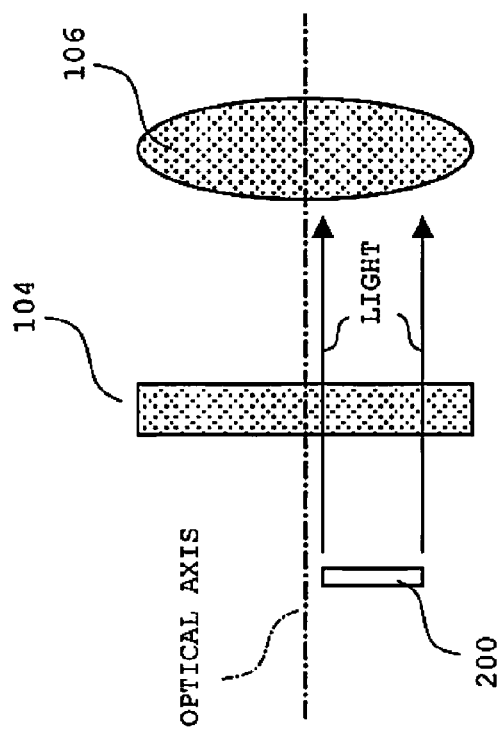

FIGS. 3A and 3B are diagrams showing an operation of the transparent flat plate 104. FIG. 3A shows a state that the transparent flat plate 104 is disposed in a direction perpendicular to the optical axis of the projection optical system 100. FIG. 3B shows a state that the transparent flat plate 104 is tilted with respect to vertical directions from the state of FIG. 3A.

When the transparent flat plate 104 is disposed in the state of FIG. 3A, light i.e. parallel beams transmitted through a display device 200 propagates without refraction by the transparent flat plate 104, and is incident onto a projection lens 106. On the other hand, when the transparent flat plate 104 is tilted as shown in the state of FIG. 3B, light i.e. parallel beams transmitted through the display device 200 is refracted by the transparent flat plate 104. As a result of the refraction, the light is incident onto the projection lens 106 at a position away from the optical axis, as compared with the state of FIG. 3A. As a result of the above operation, the apparent position of the display device 200 relative to the projection lens 106 is located at the position indicated by the broken line in FIG. 3B. In other words, as a result of tilting of the transparent flat plate 104, the optical position of the display device 200 is displaced in a direction away from the optical axis of the projection lens 106.

If the optical position of the display device 200 is vertically displaced as described above, the position of the projected image on the screen is also vertically displaced in accordance with the vertical displacement of the optical position of the display device 200. In the embodiment, a shift of a projected image resulting from a change in a zoom state is suppressed by utilizing the above operation. Specifically, by tilting the transparent flat plate 104 depending on a rotation amount of the zoom adjustment ring 103, a shift of a lower end i.e. a reference end of a projected image on the screen is suppressed as described in the following. The cam holes 102a have a shape capable of converting the rotation amount of the zoom adjustment ring 103 into a drive amount suitable for the transparent flat plate 104, in other words, a drive amount for suppressing the shift of the lower end i.e. the reference end of the projected image on the screen.

Figure 4A:
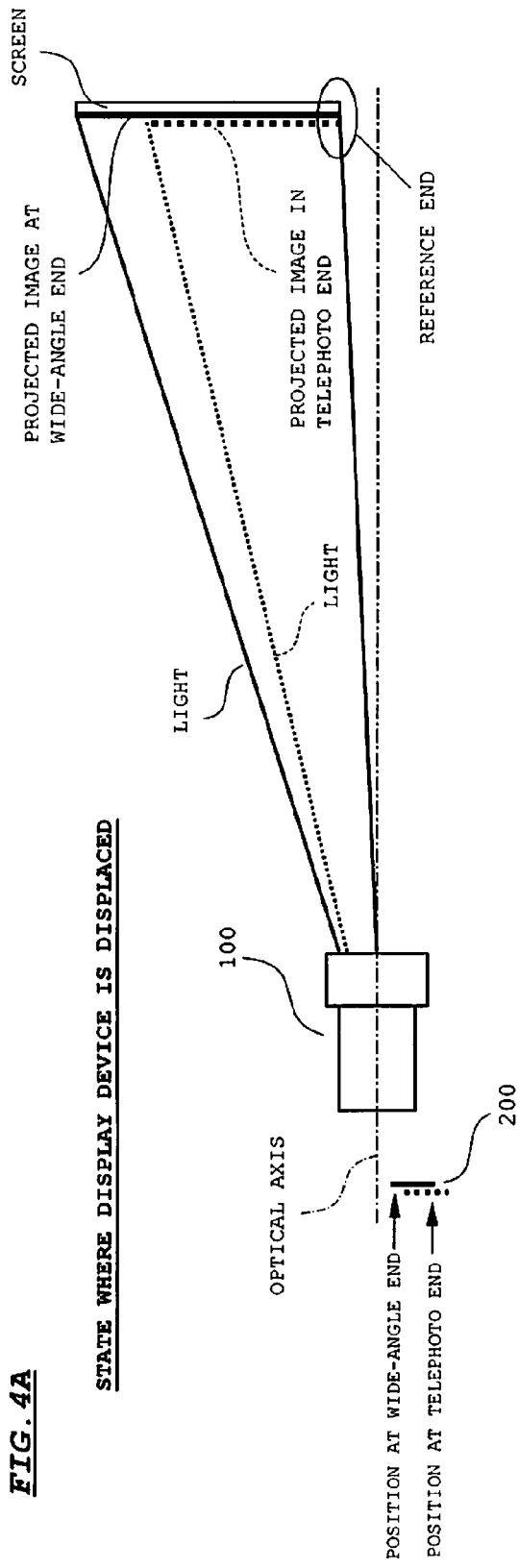
FIGS. 4A and 4B are diagrams for describing how the projection optical system of the embodiment is operated.
Figure 4B:
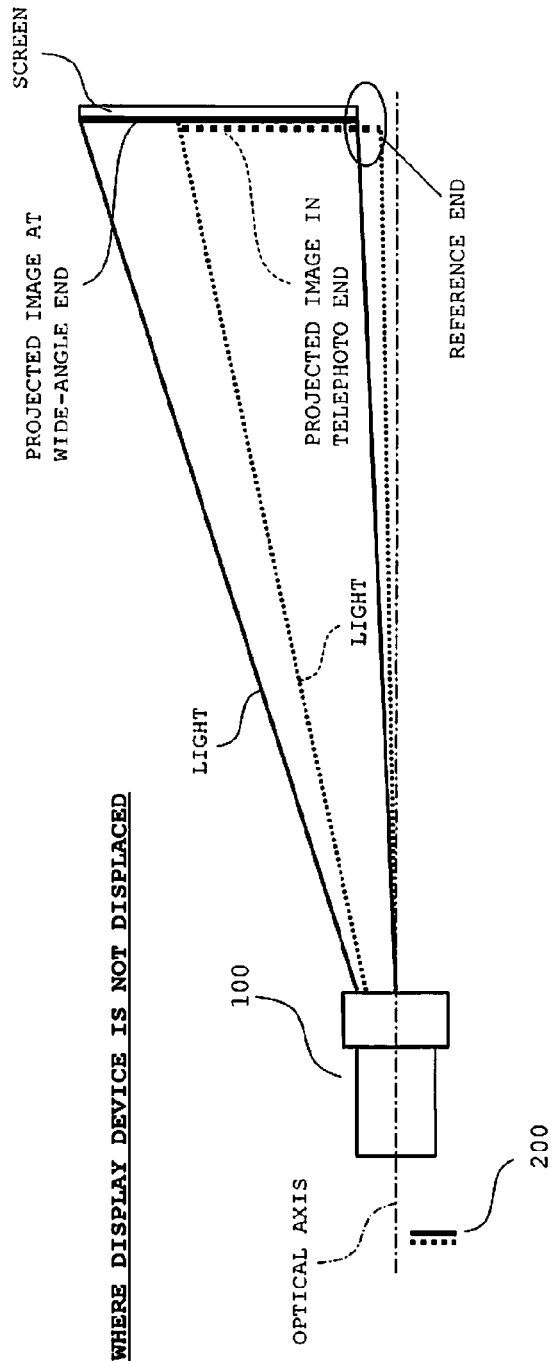

FIG. 4A is a diagram showing how the projection optical system 100 of the embodiment is operated. FIG. 4B is a diagram for describing an operation in the case where the display device 200 is not displaced vertically i.e. in the direction perpendicular to the optical axis, as a comparison with the embodiment.

Referring to FIG. 4B, let it be assumed that a projected state is changed from wide-angle end where a display image is projected onto the entirety of a screen to telephoto end by manually or electrically rotating the zoom adjustment ring 103. In the case where the display device 200 is not vertically displaced as shown in FIG. 4B, a lower end i.e. a reference end of the projected image is shifted to a lower position, as compared with the wide-angle end. As a result, a lower end portion of the projected image may be deviated from the screen. In the above case, it is necessary to locate the projected image to a proper position on the screen by lifting a front end of the projector main body or performing a like operation.

In an oblique projection type projector, however, a slight lifting of the front end of the projector main body may greatly shift the projected image on the screen. In view of the above, a cumbersome operation is required to locate the projected image at a proper position on the screen. Even after the projected image is located at a position suitable for the telephoto end, if the display state is returned to the wide-angle end, an upper end portion of the projected image may be deviated from the screen unless some measure is taken. If the upper end portion of the projected image is deviated from the screen, it is required to locate the projected image at a proper position on the screen by lowering the front end of the projector main body or performing a like operation.

Unlike the above arrangement, in the embodiment, as shown in FIG. 4A, the optical position of the display device 200 at the telephoto end is displaced to a lower position, as compared with the wide-angle end. Thereby, even if the display state is changed from the wide-angle end to the telephoto end, or from the telephoto end to the wide-angle end, there is no likelihood that the lower end i.e. the reference end of the projected image may be vertically shifted. The above arrangement eliminates deviation of a lower end portion or an upper end portion of the projected image from the screen.

As described above, the displacement of the optical position of the display device 200 is performed by tilting the transparent flat plate 104 in accordance with a rotation of the zoom adjustment ring 103. In the above arrangement, a tilt amount of the transparent flat plate 104 is adjusted to such an amount as to prevent a vertical shift of the lower end i.e. the reference end of the projected image, even if the zoom state is changed. The above adjustment is realized by properly forming the shape of the cam holes 102*a*.

As described above, according to the embodiment, even if the size i.e. the zoom state of the projected image is changed, there is no likelihood that the lower end i.e. the reference end of the projected image may be vertically shifted. Accordingly, the projected image can be positioned within the screen in any zoom state. The above arrangement enables to avoid a cumbersome operation of e.g. lifting a front end of the projector main body when the zoom state is changed, thereby providing a user-friendly projector.

According to the embodiment, driving of the zoom adjustment ring 103 and driving of the transparent flat plate 104 can be associated with each other by merely forming the pins 104*b* and the cam holes 102*a*. The above arrangement is advantageous in simplifying a mechanism for linking the zoom adjustment to the operation of shifting a projected image.

According to the embodiment, there is no need of providing a sensor for detecting a displacement amount of the zoom adjustment ring 103, a drive source for displacing the display device 200 depending on a detection result of the sensor, or a like device. The above arrangement is advantageous in simplifying the construction, and reducing the production cost of the projector.

The embodiment of the present invention may be modified in various ways other than the above.

Figure 6A:
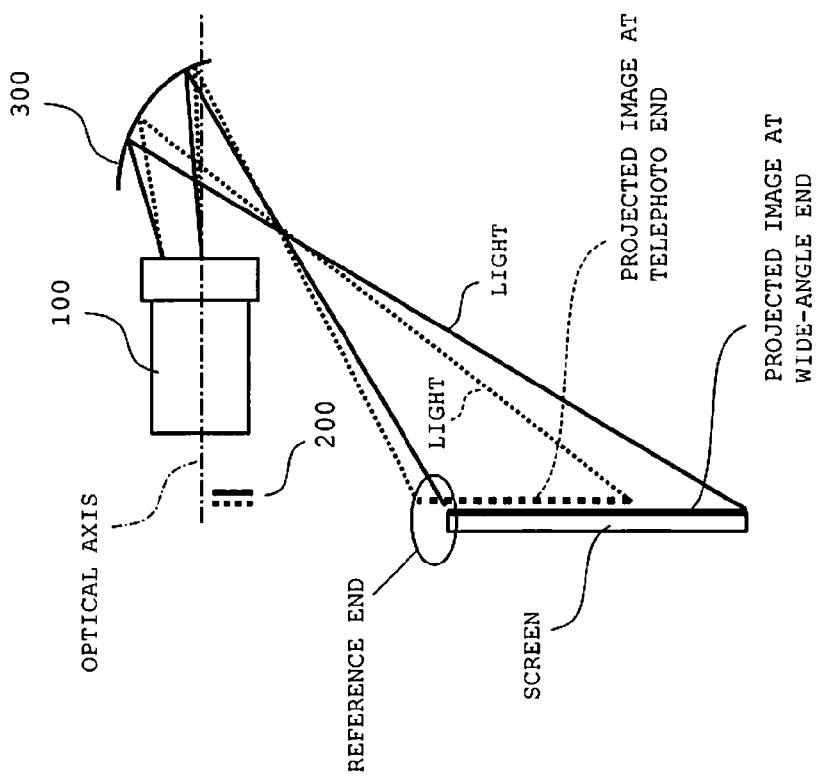
FIGS. 6A and 6B are diagrams showing still another arrangement example of the projector of the embodiment.
Figure 6B:
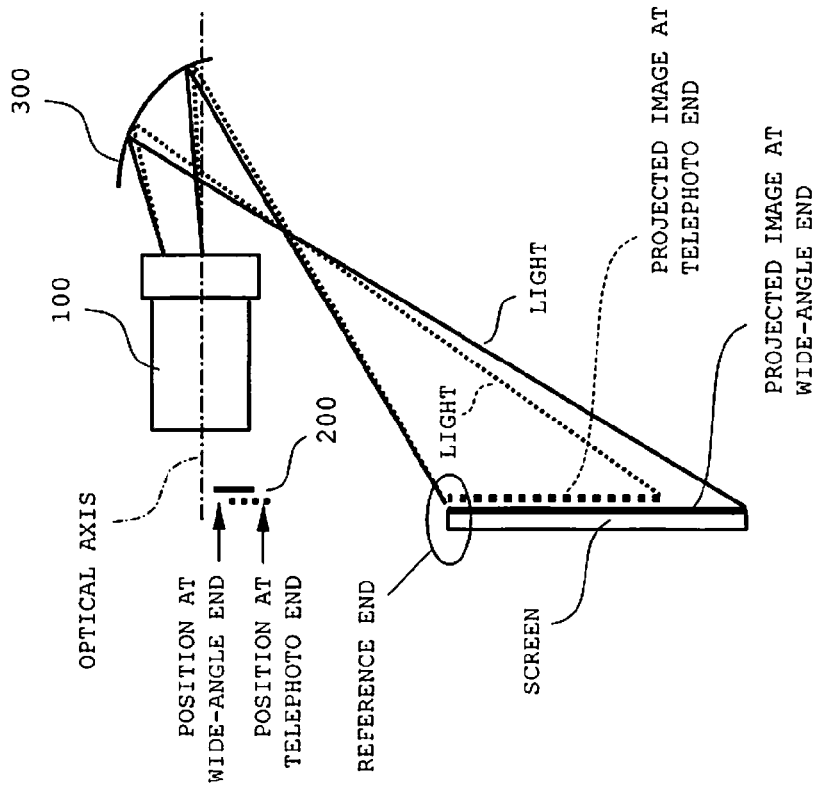

For instance, in the embodiment, light from the projection optical system 100 is directly projected onto the screen. Alternatively, for instance, as shown in FIGS. 5A and 6A, light from the projection optical system 100 may be reflected on a mirror 300 for projection onto the screen. FIG. 5A shows an arrangement example on a case that the present invention is applied to a floor type projector. FIG. 6A shows an arrangement example on a case that the present invention is applied to a ceiling-mounted type projector. FIGS. 5B and 6B are diagrams for describing operations in the case where the display device 200 is not displaced vertically i.e. in the direction perpendicular to the optical axis, as a comparison with the modifications.

Similarly to the embodiment, in the arrangement examples of FIGS. 5A and 6A, the optical position of the display device 200 is displaced vertically i.e. in the direction perpendicular to the optical axis of the projection optical system 100 in accordance with a rotation of the zoom adjustment ring 103. In the above operation, the displacement amount of the display device 200 is adjusted in such a manner that the lower end i.e. the reference end of the projected image is not shifted over an upper limit, even if the size i.e. the zoom state of the projected image is changed. Similarly to the embodiment, the adjustment is realized by properly forming the shape of the cam holes 102*a*.

In the above arrangement examples, even if the size i.e. the zoom state of the projected image is changed, there is no likelihood that the lower end i.e. the reference end of the projected image may be vertically shifted. The above arrangement enables to position the projected image within the screen in any zoom state.

Figure 7A:
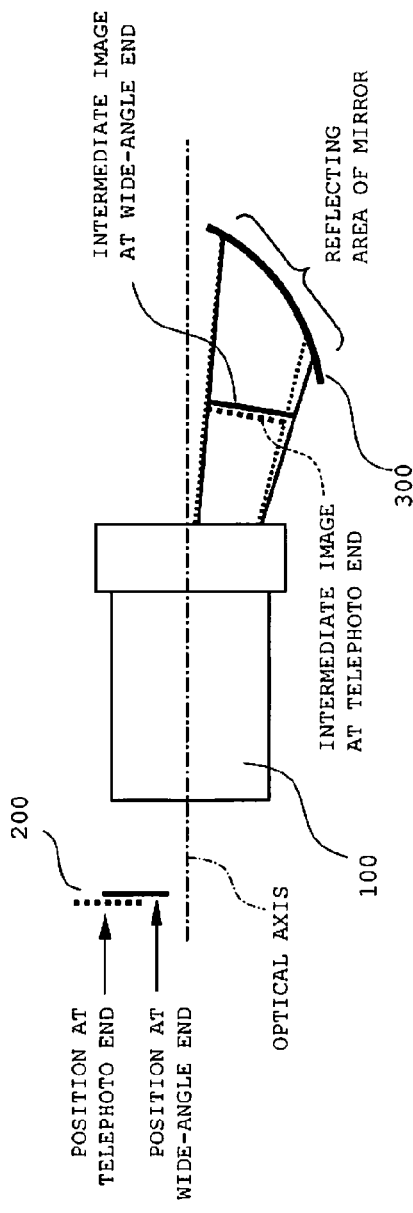
FIGS. 7A and 7B are diagrams for describing effects of the arrangement examples shown in FIGS. 5A through 6B.
Figure 7B:
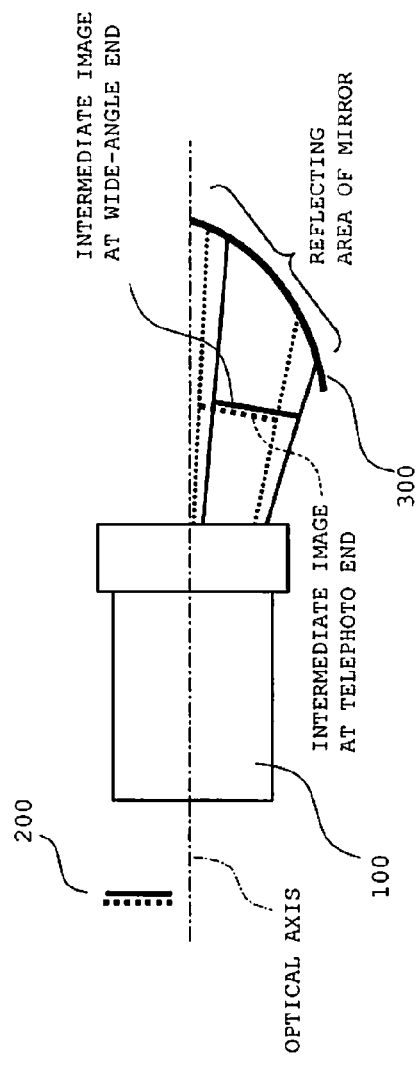

In the above arrangement examples, an intermediate image derived from the display device 200 is formed at a position between the projection optical system 100 and the mirror 300. FIG. 7A is, similarly to the embodiment, a diagram showing a state of the intermediate image in the case where the optical position of the display device 200 is vertically displaced. FIG. 7B is a diagram showing a state of the intermediate image in the case where the optical position of the display device 200 is not vertically displaced.

As shown in FIG. 7B, in the case where the optical position of the display device 200 is not vertically displaced, the forming position of the intermediate image at telephoto end is greatly shifted relative to the forming position of the intermediate image at wide-angle end. In view of the above, a large mirror 300 having a relatively large reflecting area may be necessary. On the other hand, as shown in the embodiment, in the case where the optical position of the display device 200 is vertically displaced, the forming position of the intermediate image at telephoto end is not greatly shifted relative to the forming position of the intermediate image at wide-angle end. Accordingly, the reflecting area of the mirror 300 can be reduced, which contributes to miniaturization of the mirror 300.

In FIGS. 5A through 7B, the mirror 300 is illustrated independently of the projection optical system 100. The mirror 300, however, may be accommodated in the projection optical system 100. In other words, the inventive projection optical system may include a mirror for enlargedly projecting light from a projection lens onto a projection plane, according to needs.

In the embodiment, the optical position of the display device 200 is vertically displaced by tilting the transparent flat plate 104. Alternatively, the position of the display device 200 relative to the projection lens 106 may be displaced by physically moving the display device 200 in vertical directions.

Figure 8:
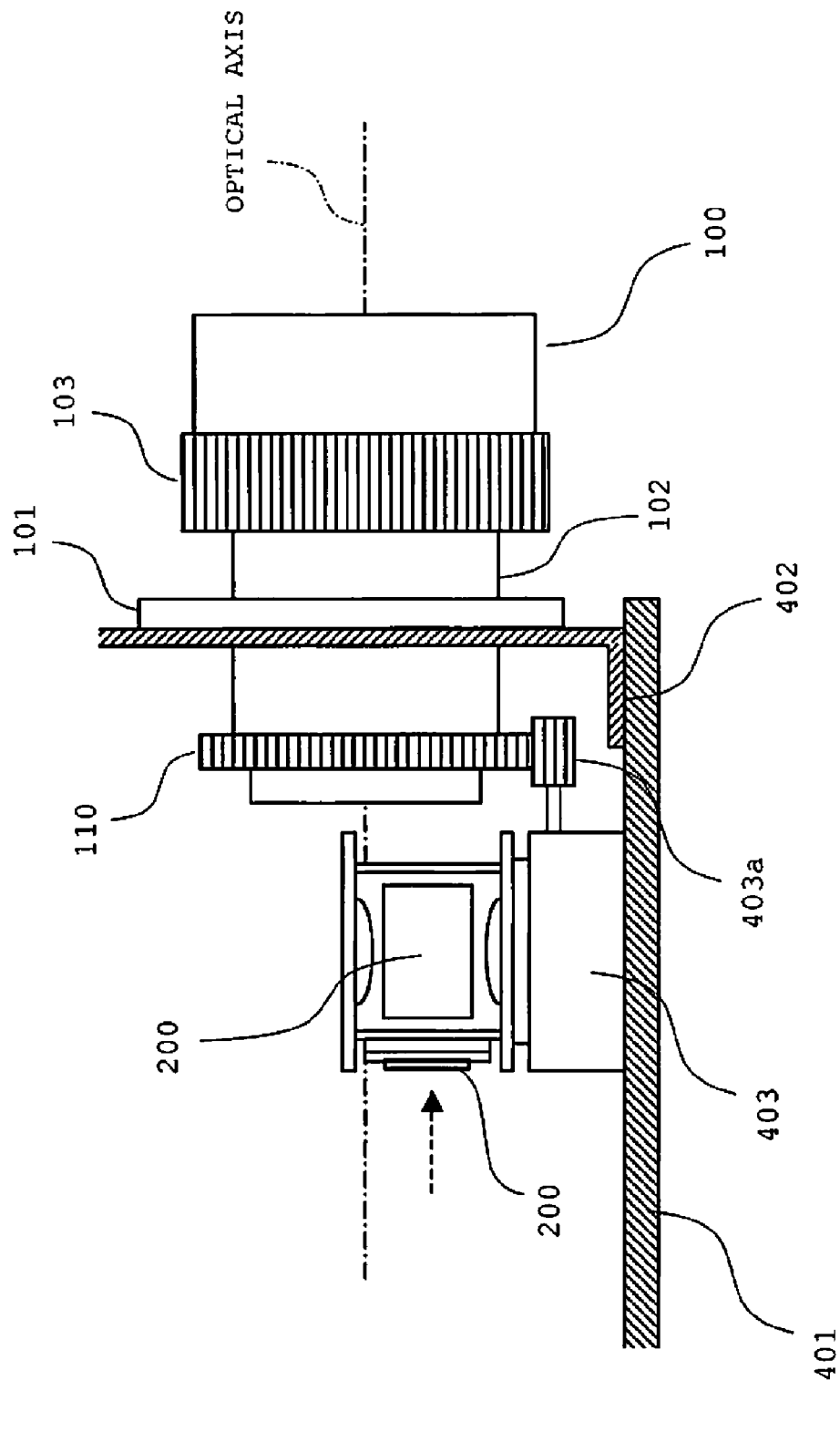
FIG. 8 is a diagram showing an arrangement of a projection unit embodying the present invention.

FIG. 8 is a diagram showing an arrangement example of the above modification, as a projection unit. The above arrangement example corresponds to an embodiment of a projection unit recited in claims 6 through 8.

In the above arrangement example, a gear 110 is integrally mounted on an outer surface of the outer lens barrel 102. The projection optical system 100 is mounted on a chassis 401 in a state that the support member 101 is fixed to a support block 402 of the chassis 401.

A Z-axis stage 403 is mounted on the chassis 401. The display device 200 for transmitting rays of R (red), G(green), and B (blue), and an optical assembly including a dichroic prism (not shown) for synthesizing the rays transmitted through the display device 200 and guiding the rays to the projection optical system 100 are mounted on the Z-axis stage 403. A gear 403*a* is mounted on a driving shaft of the Z-axis stage 403 in a state that the gear 403a is meshed with the gear 110 as a constituent element of the projection optical system 100.

When the gear 110 is rotated in accordance with a rotation of the zoom adjustment ring 103, the gear 403a in mesh with the gear 110 is rotated, and the Z-axis stage 403 is driven. Thereby, the optical assembly mounted on the Z-axis stage 403 is moved vertically i.e. in the direction perpendicular to the optical axis of the projection optical system 100, whereby the display device 200 is vertically moved.

In the above arrangement example, similarly to the embodiment, the display device 200 is vertically displaced in association with the rotation of the zoom adjustment ring 103. Accordingly, a similar effect as the effect of the embodiment is obtained. Specifically, even if the size i.e. the zoom state of the projected image is changed, there is no likelihood that the lower end i.e. the reference end of the projected image may be vertically shifted. The above arrangement enables to position the projected image on the screen in any zoom state.

In the arrangement example of FIG. 8, the display device 200 is vertically displaced by using the Z-axis stage 403. Alternatively, the display device 200 may be displaced by a mechanism other than the Z-axis stage 403.

Figure 9B:
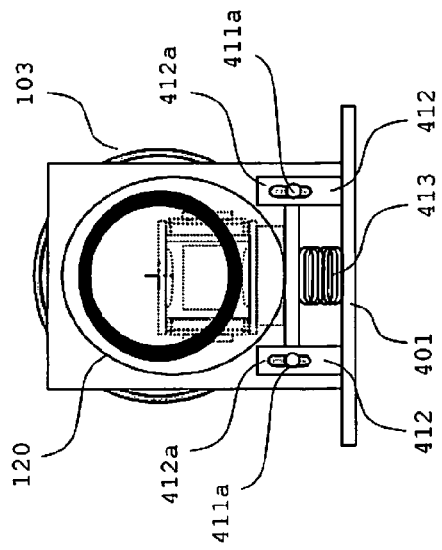
Figure 9C:
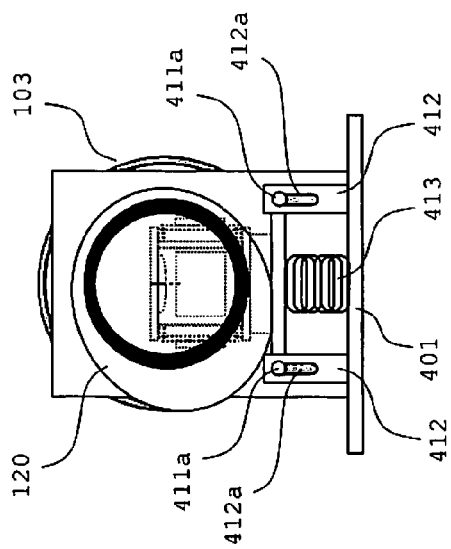
Figure 9A:
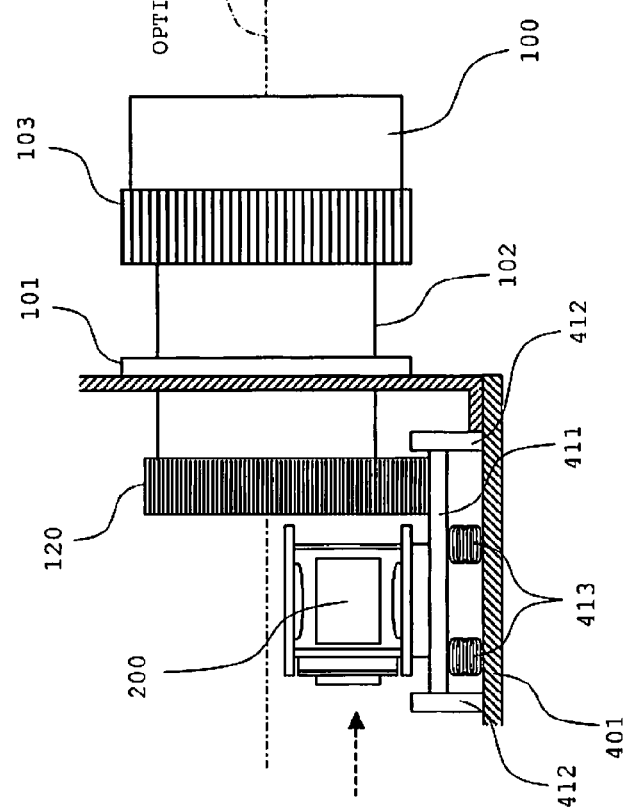

FIGS. 9A, 9B, and 9C are diagrams showing an arrangement example, as a projection unit, in the case where a display device 200 is displaced by using an eccentric cam. FIG. 9A is a side view of the projection unit in the arrangement example. FIGS. 9B and 9C are diagrams showing the arrangement of FIG. 9A, viewed from the left side of FIG. 9A, respectively. Similarly to the arrangement example of FIG. 8, the arrangement example in FIGS. 9A through 9C corresponds to an embodiment of the projection unit recited in claims 6 through 8.

In the above arrangement example, an eccentric cam 120 is integrally mounted on an outer surface of the outer lens barrel 102.

Four guide members 412 formed with vertically extending guide holes 412a are attached to a chassis 401. A movable stage 411 is mounted on the guide members 412 by engagement of pins 411a with the guide holes 412a in such a manner that the movable stage 411 is vertically movable. De-energization of the energized springs 413 are mounted between the movable stage 411 and the chassis 401. Thereby, an upper end of the movable stage 411 is pressed against the eccentric cam 120. The display device 200 for transmitting rays of R (red), G(green), and B (blue), and an optical assembly including a dichroic prism (not shown) for synthesizing the rays transmitted through the display device 200 and guiding the rays to the projection optical system 100 are mounted on the movable stage 411.

In the above arrangement example, when the eccentric cam 120 is rotated in accordance with a rotation of the zoom adjustment ring 103, the distance from a rotating axis of the eccentric cam 120 to a contact point of the eccentric cam 120 with the movable stage 411 is changed. Thereby, the movable stage 411 is vertically moved, and the display device 200 is vertically moved.

FIG. 9B is a diagram showing a state that the movable stage 411 is pressed down to a lowermost position. When the eccentric cam 120 is rotated clockwise from the state of FIG. 9B in accordance with a rotation of the zoom adjustment ring 103, the distance from the rotating axis of the eccentric cam 120 to the contact point of the eccentric cam 120 with the movable stage 411 is shortened, with the result that the movable stage 411 is upwardly moved by de-energization of the energized springs 413. Thereby, the display device 200 is upwardly moved along with the optical assembly.

Similarly to the embodiment, in the above arrangement example, the eccentric cam 120 has a shape capable of converting the rotation amount of the zoom adjustment ring 103 into a drive amount suitable for the display device 200, in other words, a drive amount for suppressing a shift of the lower end i.e. the reference end of the projected image on the screen.

In the above arrangement example, similarly to the embodiment, the display device 200 is vertically displaced in association with the rotation of the zoom adjustment ring 103. Accordingly, a similar effect as the effect of the embodiment is obtained. Specifically, even if the size i.e. the zoom state of the projected image is changed, there is no likelihood that the lower end i.e. the reference end of the projected image may be vertically shifted. The above arrangement enables to position the projected image on the screen in any zoom state.

In the embodiment and the foregoing arrangement examples, the optical position of the display device 200 is displaced by a mechanical linkage with the rotation of the zoom adjustment ring 103. Alternatively, the optical position of the display device 200 may be displaced by an electric linkage with the rotation of the zoom adjustment ring 103.

Figure 10:
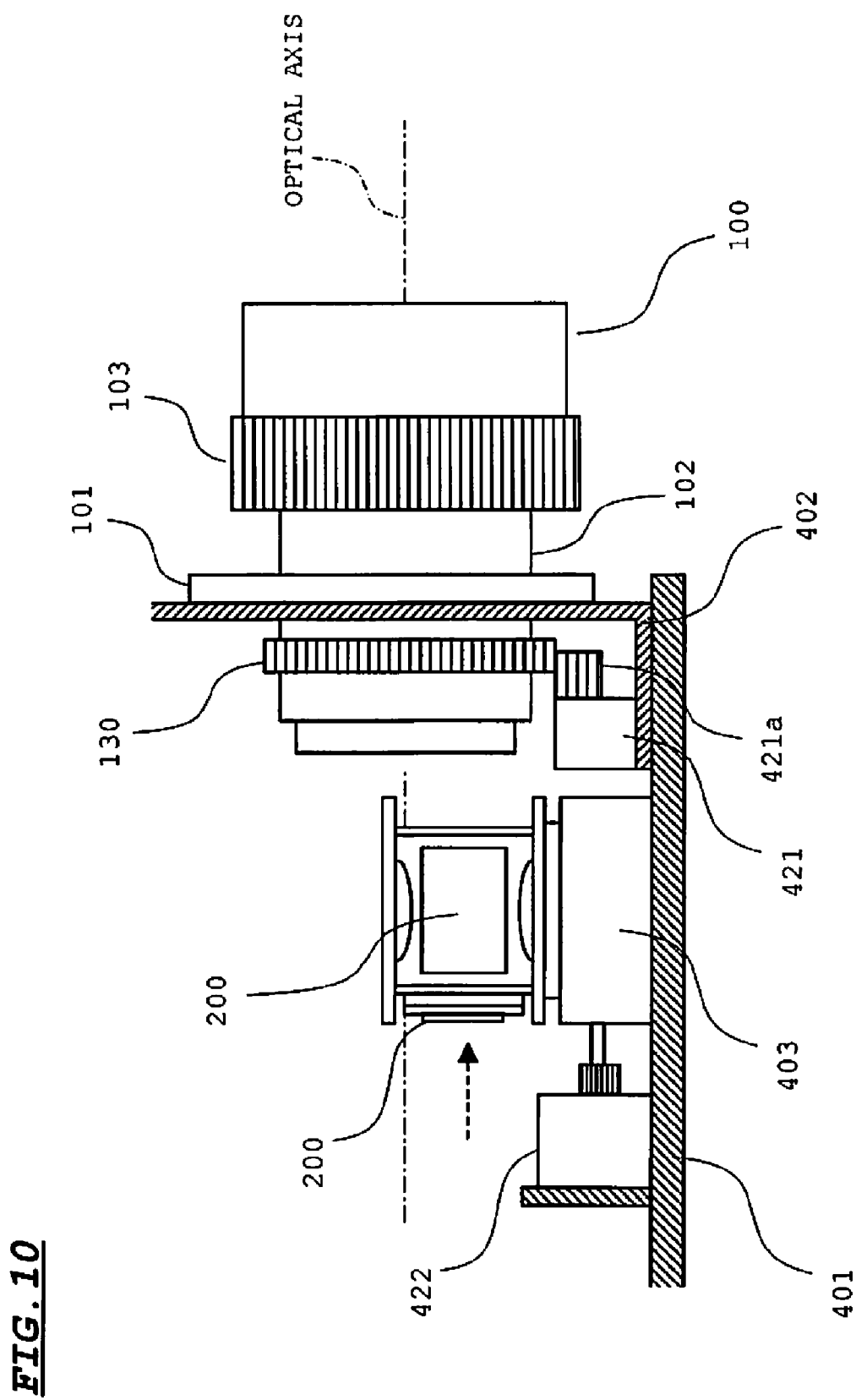
FIG. 10 is a diagram showing a still another arrangement example of the projection unit of the embodiment.

FIG. 10 is a diagram showing an arrangement example of the above modification, as a projection unit. The arrangement example of FIG. 10 corresponds to an embodiment of a projection unit recited in claims 9 and 10.

In the above arrangement example, a gear 130 is integrally mounted on an outer surface of the outer lens barrel 102. The projection optical system 100 is mounted on a chassis 401 in a state that the support member 101 is fixed to a support block 402 on the chassis 401.

A Z-axis stage 403 is mounted on the chassis 401. The display device 200 for transmitting rays of R (red), G(green), and B (blue), and an optical assembly including a dichroic prism (not shown) for synthesizing the rays transmitted through the display device 200 and guiding the rays to the projection optical system 100 are mounted on the Z-axis stage 403. A driving shaft of a motor 422 is interconnected with a driving shaft of the Z-axis stage 403. Further, a potentiometer 421 is mounted on the support block 402 in a state that a gear 421a mounted on a volume shaft of the potentiometer 421 is meshed with the gear 130 as a constituent element of the projection optical system.

When the gear 130 is rotated in accordance with a rotation of the zoom adjustment ring 103, the volume shaft of the potentiometer 421 interconnected with the gear 130 is rotated. The potentiometer 421 is constructed in such a manner that a resistance value of the potentiometer 421 is varied in accordance with a rotation of the volume shaft to vary a voltage value at an output terminal. Thereby, a rotational position or a zoom adjustment amount of the zoom adjustment ring 103 is detectable based on an output voltage from the potentiometer 421.

In the above arrangement example, the zoom adjustment amount is detected based on the output voltage from the potentiometer 421, and the motor 422 is driven depending on a detection result of the potentiometer 421. Thereby, the Z-axis stage 403 is driven, and the display device 200 is displaced to a position corresponding to the zoom adjustment amount.

Figure 11:
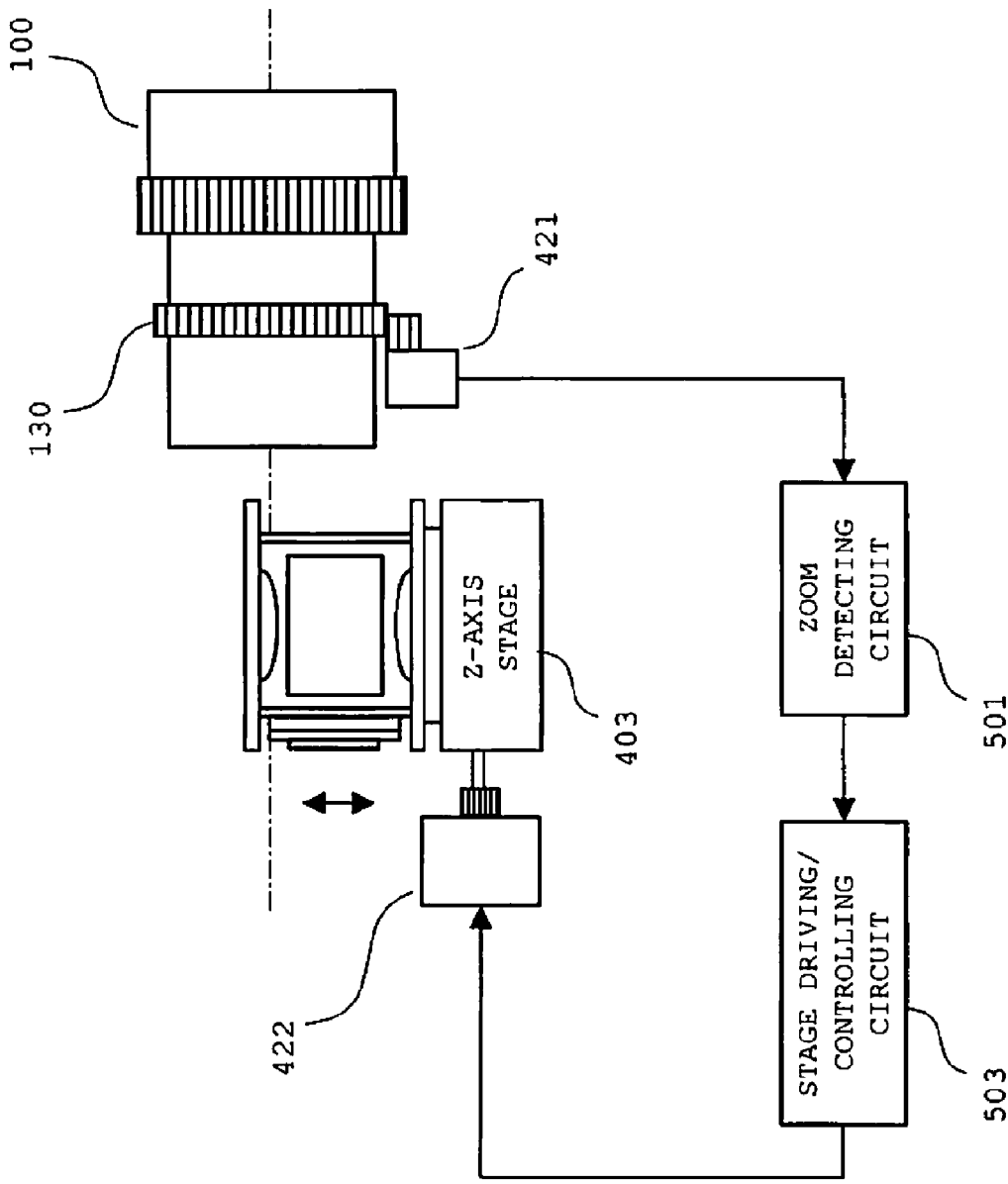
FIG. 11 is a diagram showing an arrangement of the projection unit of the embodiment, and a control system to be used in the projection unit.

FIG. 11 is a diagram showing an arrangement example of a control circuit for drivingly controlling the projection unit shown in FIG. 10.

The zoom detecting circuit 501 analog-to-digitally converts an output voltage from the potentiometer 421, and detects a zoom adjustment amount by a CPU. The stage driving/controlling circuit 502 determines a rotation direction and a rotation amount of the motor 422 in accordance with the zoom adjustment amount detected by the zoom detecting circuit 501 to drive the motor 422. Thereby, the Z-axis stage 403 is upwardly or downwardly moved, and the display device 200 is moved in accordance with the zoom adjustment amount.

In the above arrangement example, the stage driving/controlling circuit 502 converts the zoom adjustment amount detected by the zoom detecting circuit 501 into a displacement amount suitable for the display device 200, in other words, a displacement amount for suppressing a shift of the lower end i.e. the reference end of the projected image on the screen, and drives the motor 422 to attain the displacement amount.

In the above arrangement example, similarly to the embodiment, the display device 200 is vertically displaced in association with the rotation of the zoom adjustment ring 103. Accordingly, a similar effect as the effect of the embodiment is obtained. Specifically, even if the size i.e. the zoom state of the projected image is changed, there is no likelihood that the lower end i.e. the reference end of the projected image may be vertically shifted. The above arrangement enables to position the projected image on the screen in any zoom state.

The embodiment and the arrangement examples of the present invention are described as above. The present invention, however, is not limited to the foregoing description. In the foregoing description, a shift of the reference end of the projected image is suppressed at the time of adjusting the zoom. Alternatively, the position of the projected image on the screen may be adjusted in such a manner that a part of the projected image is not deviated from the screen at the time of adjusting the zoom. The modified adjustment may be realized by adjusting the optical position of the display device 200.

It is to be understood that the embodiment of the present invention may be changed or modified in various ways, as far as such changes and modifications do not depart from the scope of the present invention hereinafter defined.

What is claimed is:

1. A projection optical system for use in a projection display for enlargedly projecting an image drawn on a display device part according to a drive signal that controls the display device part onto a projection plane while minimizing offset position error, the projection optical system comprising:
    a zoom adjuster comprising a zoom adjustment ring that rotates circumferentially with a lens barrel for adjusting a size of the projected image on the projection plane; and
    a shift adjuster comprising a tiltable transparent flat plate operably connected to a transmitting mechanism for converting a rotation drive amount of the zoom adjustment ring into a tilt direction amount of the flat plate perpendicular to the optical axis of the projection optical system in accordance with a change in the size of the projected image by the zoom adjuster, wherein
    the transmitting mechanism is a mechanical structure operably connected to the zoom adjuster to allow simultaneous tilting of the transparent plate with driving rotation of the zoom adjuster ring.

2. The projection optical system according to claim 1, wherein
    the shift adjuster adjusts the optical position of the display device part with respect to the optical axis in such a manner as to suppress a shift of a reference end of the projected image on the projection plane in accordance with the change in the size of the projected image by the zoom adjuster.

3. A projection optical system for use in a projection display for enlargedly projecting an image on a display device part onto a projection plane, the projection optical system comprising:
    a zoom adjuster for adjusting a size of the projected image on the projection plane; and
    a shift adjuster for displacing an optical position of the display device part with respect to an optical axis of the projection optical system in a direction perpendicular to the optical axis in accordance with a change in the size of the projected image by the zoom adjuster, wherein
    the zoom adjuster includes a zoom adjustment ring operative to change a zoom state of the projected image in accordance with a driving rotation of the zoom adjustment ring in a circumferential direction thereof, and
    the shift adjuster includes an optical device for displacing the optical position of the display device part in the direction perpendicular to the optical axis, and a transmitting mechanism for converting a rotation drive amount of the zoom adjustment ring into a displacement amount of the optical device to transmit the rotation drive amount of the zoom adjustment ring to the optical device, wherein
    the optical device is a transparent flat plate,
    the projection optical system is operative to change the optical position of the display device part with respect to the optical axis by tilting the transparent flat plate with respect to the optical axis, and
    the transmitting mechanism includes:
    a cylindrical member operable in association with the zoom adjustment ring, and having a cam groove extending in such a direction as to tilt the optical device; and
    a projection projecting from the transparent flat plate and engaged with the cam groove.

4. A projection unit provided with a display device part on which an image is drawn according to a drive signal, and a projection optical system for enlargedly projecting the image on the display device part onto a projection plane, the projection unit comprising:
    a zoom adjuster for adjusting a size of the projected image on the projection plane; and
    a shift adjuster for displacing an position of the display device part with respect to an optical axis of the projection optical system in a direction perpendicular to the optical axis in accordance with a change in the size of the projected image by the zoom adjuster; and wherein
    the zoom adjuster includes a zoom adjustment ring operative to change a zoom state of the projected image in accordance with a driving rotation of the zoom adjustment ring in a circumferential direction thereof, and the shift adjuster includes a shift mechanism for changing the positional relationship of the display device part with respect to the optical axis in the direction perpendicular to the optical axis, and a transmitting mechanism having a mechanical structure for transmitting a rotation drive amount of the zoom adjustment ring to the shift mechanism,
    wherein the optical position of the display device part at a telephoto end projected image condition is displaced in a direction away from the optical axis, as compared with the optical position of the display device part when adjusted to a wide-angle end projected image condition.

5. The projection unit according to claim 4, wherein
    the shift adjuster adjusts the positional relationship of the display device part with respect to the optical axis in such a manner as to suppress a shift of a reference end of the projected image on the projection plane in accordance with the change in the size of the projected image by the zoom adjuster.

6. A projection display, comprising:

a projection optical system for enlargedly projecting an image drawn on a display device part according to a drive signal onto a projection plane while minimizing offset position error, wherein the projection optical system includes:

a zoom adjuster comprising a zoom adjustment ring that rotates circumferentially with a lens barrel for adjusting a size of the projected image on the projection plane; and a shift adjuster comprising a tiltable transparent flat plate operably connected to a transmitting mechanism for converting a rotation drive amount of the zoom adjustment ring into a tilt direction amount of the flat plate perpendicular to the optical axis of the projection optical system in accordance with a change in the size of the projected image by the zoom adjuster, wherein the transmitting mechanism is a mechanical structure operably connected to the zoom adjuster to allow simultaneous tilting of the transparent plate with driving rotation of the zoom adjuster ring.

7. The projection display devise-according to claim 6, wherein the shift adjuster adjusts the optical position of the display device part with respect to the optical axis in such a manner as to suppress a shift of a reference end of the projected image on the projection plane in accordance with the change in the size of the projected image by the zoom adjuster.

8. A projector, comprising:

a projection optical system for enlargedly projecting an image on a display device part onto a projection plane, wherein the projection optical system includes:

a zoom adjuster for adjusting a size of the projected image on the projection plane; and a shift adjuster for displacing an optical position of the display device part with respect to an optical axis of the projection optical system in a direction perpendicular to the optical axis in accordance with a change in the size of the projected image by the zoom adjuster, and wherein the zoom adjuster includes a zoom adjustment ring operative to change a zoom state of the projected image in accordance with a driving rotation of the zoom adjustment ring in a circumferential direction thereof, and the shift adjuster includes an optical device for displacing the optical position of the display device part in the direction perpendicular to the optical axis, and a transmitting mechanism for converting a rotation drive amount of the zoom adjustment ring into a displacement amount of the optical device to transmit the rotation drive amount of the zoom adjustment ring to the optical device;

the optical device is a transparent flat plate, and the projector is operative to change the optical position of the display device part with respect to the optical axis by tilting the transparent flat plate with respect to the optical axis; wherein the transmitting mechanism includes:

a cylindrical member operable in association with the zoom adjustment ring, and having a cam groove extending in such a direction as to tilt the optical device; and a projection projecting from the transparent flat plate and engaged with the cam groove.

9. A projection unit provided with a display device part on which an image is drawn according to a drive signal, and a projection optical system for enlargedly projecting the image on the display device part onto a projection plane, the projection unit comprising:

a zoom adjuster for adjusting a size of the projected image on the projection plane;

a shift adjuster for changing the positional relationship of the display device part with respect to an optical axis of the projection optical system in a direction perpendicular to the optical axis in accordance with a change in the size of the projected image by the zoom adjuster, and a zoom detector for detecting an adjustment amount of the zoom adjuster, wherein the shift adjuster changes the relational position of the display device part with respect to the optical axis of the projection optical system, based on the adjustment amount detected by the zoom detector, and wherein the optical position of the display device part at a telephoto end is displaced in a direction away from the optical axis, as compared with the optical position of the display part at a wide-angle end.

10. The projection unit according to claim 9, wherein the zoom adjuster includes a zoom adjustment ring operative to change a zoom state of the projected image in accordance with a rotation driving of the zoom adjustment ring in a circumferential direction thereof, the zoom detector includes a rotational position sensor for detecting the position of the zoom adjustment ring, and the shift adjuster includes a shift mechanism for changing the positional relationship of the display device part in the direction perpendicular to the optical axis, and a drive source for driving the shift mechanism.

* * * * *